UNITED STATES PATENT OFFICE.

OSCAR M. LAMSENS, OF DETROIT, MICHIGAN.

METHOD OF PREPARING BEER.

1,177,117.

Specification of Letters Patent.

Patented Mar. 28, 1916.

No Drawing.

Application filed April 17, 1915. Serial No. 22,196.

*To all whom it may concern:*

Be it known that I, OSCAR M. LAMSENS, a citizen of the United States of America, residing at Detroit, in the county of Wayne and State of Michigan, have invented certain new and useful Improvements in Methods of Preparing Beer, of which the following is a specification.

In beers which are brewed in the ordinary manner, there is a tendency to cloud or become turbid when they are chilled, especially after pasteurization. Such beer, or beer that has been bottled for some time and is consequently in such condition otherwise as to become clouded when chilled, is found on examination to contain coagulated albuminoids. In other words the albuminoids that are ordinarily carried in the beer in such condition as to be invisible, become coagulated when the beer is reduced in temperature and so impair the brilliancy and clearness of the liquor.

This invention relates to the preparation of beers and ales, and more particularly beers for bottling, whereby the product possesses great stability and does not tend to become clouded or turbid even when chilled to a considerably lower than normal temperature, the liquor in fact being what may be termed "chill-proof beer" or the like.

According to the method herein described, advantage is taken of the fact that the yeast which is present in greater or less quantities in the beer before it has been thoroughly settled, carries or contains proteolytic enzyms but in such manner because of the organization or structure of the yeast cells that the class of albuminoids in beer which tend to become coagulated under reduction of temperature, do not get into contact with the enzyms and are not affected thereby. Accordingly the beer is given such treatment that the yeast cell structures in a portion of it at least are disrupted, the yeast-contained enzyms are liberated, diffused through the beer, act upon and render the albumins non-coagulable and so become effective in preventing cloudiness if the beer is afterward chilled for use.

I have found that a reduction in temperature sufficient to bring about an expansion of the moisture or liquid in the cells great enough to disrupt the cells and thereby permit the diffusion of the contained enzyms through the beer when the temperature is afterward raised until the mass becomes fluid, while it renders the yeast inert, is not deleterious in any manner to these enzyms which retain the capability of acting upon coagulable albuminoids. That is, in a portion at least of the yeast which is rendered inactive and in which the yeast organisms become inert by this reduction in temperature, there is such consequent change in the structure of the yeast cells that the proteolytic enzyms are no longer entrapped therein but diffuse themselves through the beer and thus are free to and do act upon the albuminoids so that the latter no longer coagulate if the beer is afterward reduced in temperature. Consequently the latter does not lose its brilliancy or clearness when afterward chilled and is especially fitted for bottling and for shipping long distances without impairment.

In carrying out the method, the beer, or enough thereof to produce the desired result in the entire volume, is reduced to such temperature as to disrupt the cell structures by the consequent expansion of the moisture or liquid in the cells and thus allow the contained proteolytic enzym to diffuse through the beer and act upon the coagulable albuminoids. In practice, that portion of the beer in which sedimentation of the yeast has occurred, as in the bottom of a chip or settling cask, is reduced to a temperature at which the mass solidifies and consequent disruption of the yeast cells takes place. As the melting point of yeast solidified by cold is substantially at 26° F. the temperature is found in practice to be below this, and in order to obtain the best disruptive effect, it is best to lower the temperature as quickly as possible, and to even carry it down to within a few degrees of zero. The freezing is continued until sufficient of the yeast has been affected to liberate enough of the enzyms to do the work in the desired volume of beer. The return to normal temperature is accomplished by permitting the frozen portion to reassume the liquid state and to commingle with the main body. Of course any means may be employed for reducing the temperature of the beer, so long as the desired amount to affect the entire body of beer, which can be readily obtained by experiment, is given the necessary low temperature. For example, a freezing pipe or coil from a refrigerator plant such as is commonly used in a brewery, may be introduced into the lower portion of the settling or chip cask. As a result that portion of the beer adjacent the refrigerating pipe is greatly reduced in temperature and becomes solidified, and after this has occurred, the refrigerating medium is withdrawn from the coil, when the cold or frozen portion of the beer regains the temperature of the greater mass of beer and the yeast which has been thus rendered inactive is so organized that diffusion occurs from the yeast cells of the proteolytic enzymes therein and they thereafter so act upon the albuminoids that chilling of the beer no longer coagulates them. In practice I use about thirty lineal feet of inch and a quarter pipe in the bottom of a two hundred barrel cask through which pipe I pass a suitable freezing agent and continue this for twenty four hours until the yeast sedimentation is solidified. I then discontinue the freezing by withdrawal of and stopping circulation of the freezing medium. Or during the process of brewing, a small portion of the beer, that is, a necessary portion, may be diverted into a refrigerating vessel or compartment and there reduced in temperature to the necessary point, dependent on circumstances, and then returned or passed along into the main body of the beer which is otherwise undisturbed in temperature. As a result of this, the portion of the yeast thus changed, or the proteolytic enzymes in the yeast which has thus been treated, thereby cause the albuminoids to remain in such condition or at least in such form that they do not tend to coagulate if the beer after packaging is placed on ice or in other ways chilled as desired.

What I claim is:—

1. In the art of brewing, a step which consists in liberating a sufficient amount of the proteolytic enzymes from the yeast while contained in the beer to prevent coagulation of the albuminoids when the beer is chilled.

2. In the art of brewing, a step which consists in liberating a sufficient amount of the proteolytic enzymes from the yeast by reduction of the temperature thereof while contained in the beer to prevent coagulation of the albuminoids when the beer is chilled.

In testimony whereof I affix my signature in presence of two witnesses.

OSCAR M. LAMSENS.

Witnesses:
C. R. STICKNEY,
ANNA M. DORR.